United States Patent [19]

Castelli et al.

[11] 4,397,538

[45] Aug. 9, 1983

[54] BELT ALIGNMENT SYSTEM

[75] Inventors: Vittorio Castelli, Scarsdale; Ralph A. Hamaker, Penfield, both of N.Y.; Willard J. Opocensky, Los Angeles, Calif.

[73] Assignee: Xerox Corporation, Stamford, Conn.

[21] Appl. No.: 298,982

[22] Filed: Sep. 3, 1981

[51] Int. Cl.³ ...................... G03G 15/00; B65G 39/16

[52] U.S. Cl. ................................ 355/3 BE; 198/806; 226/23; 355/16

[58] Field of Search ................ 355/3 BE, 16; 226/23, 226/45; 198/806

[56] References Cited

U.S. PATENT DOCUMENTS

| | | | |
|---|---|---|---|
| 3,368,665 | 2/1968 | Jinkins | 226/23 X |
| 3,435,693 | 4/1969 | Wright et al. | 74/241 |
| 3,500,694 | 3/1970 | Jones et al. | 74/241 |
| 3,540,571 | 11/1970 | Morse et al. | 198/202 |
| 3,698,540 | 10/1972 | Jordan | 198/806 |
| 3,702,131 | 11/1972 | Stokes et al. | 198/202 |
| 3,715,027 | 2/1973 | Fujimoto | 198/806 |
| 3,726,588 | 4/1973 | Moser | 355/3 BE |
| 3,818,391 | 6/1974 | Jordan et al. | 355/16 X |
| 3,913,729 | 10/1975 | Andrews | 226/23 X |
| 3,973,446 | 8/1976 | Vasilantone | 198/806 X |
| 4,027,966 | 6/1977 | Jordan | 355/16 |
| 4,061,222 | 12/1977 | Rushing | 226/23 X |
| 4,092,914 | 6/1978 | Burrough et al. | 198/806 |
| 4,170,175 | 10/1979 | Bartholomew | 355/3 BE |
| 4,174,171 | 11/1979 | Hamaker et al. | 226/23 X |
| 4,196,803 | 4/1980 | Lovett | 198/806 |
| 4,286,706 | 9/1981 | Castelli et al. | 355/3 BE |
| 4,344,693 | 8/1982 | Hamaker | 355/3 BE |

OTHER PUBLICATIONS

*Research Disclosure*, pp. 29–31, May 1976.

*Primary Examiner*—R. L. Moses

[57] ABSTRACT

An apparatus which controls lateral alignment of a belt arranged to move along a predetermined path. The belt is supported by a pivoted roller. A member having a pair of opposed, spaced flanges extending outwardly therefrom is mounted slidably on a shaft extending outwardly from one end of the roller. A spring, contacting the flanged member, resiliently urges one of the flanges into continuous engagement with one side of the belt. Movement of the belt from the predetermined path slides the flanged member so that one of the flanges frictionally rotates a disc interposed therebetween. Rotation of the disc tilts the roller restoring the belt to the predetermined path of movement.

12 Claims, 6 Drawing Figures

BELT ALIGNMENT SYSTEM

This invention relates generally to an electrophotographic printing machine, and more particularly concerns an improved apparatus for controlling the lateral movement of a moving belt.

In the process of electrophotographic printing, a photoconductive belt is charged to a substantially uniform potential so as to sensitize the surface thereof. The charged portion of the photoconductive belt is exposed to a light image of an original document being reproduced. Exposure of the charged photoconductive belt selectively discharges the charge thereon in the irradiated areas. This records an electrostatic latent image on the photoconductive belt corresponding to the informational areas contained within the original document. After the electrostatic latent image is recorded on the photoconductive belt, the latent image is developed by bringing a developer mixture into contact therewith. Generally, the developer mixture comprises toner particles adhering triboelectrically to carrier granules. The toner particles are attracted from the carrier granules to the latent image forming a toner powder image on the photoconductive belt. The toner powder image is then transferred from the photoconductive belt to a copy sheet. Finally, the copy sheet is heated to permanently affix the toner particles thereto in image configuration.

As electrophotographic printing machines become increasingly rapid, automatic handling of original documents is highly desirable. The document handling system must be capable of recirculating either simplex or duplex sheets. The document handling unit must operate flawlessly to virtually eliminate the risk of damaging the original document and minimizing machine shutdowns due to jams or misfeeds. Frequently, this is achieved through the utilization of endless belts entrained about rollers for advancing the document through at least a portion of its path of travel.

Since the photoconductive belt in the printing machine passes through many processing stations during the printing operation, lateral alignment thereof is critical and must be controlled within prescribed tolerances. As the photoconductive belt passes through each of these processing stations, the location of the latent image must be precisely defined in order to optimize the operations relative to one another. If the position of the latent image deviates from processing station to processing station, copy quality may be significantly degraded. Hence, lateral movement of the photoconductive belt must be minimized so that the belt moves in a predetermined path.

Similarly, the belt of the document handling system employed to transport original documents to and from the exposure station must move through a predetermined path. The lateral movement of the belt used in the document handling system must be controlled in order to insure the correct positioning of the original document relative to the optical system of the exposure station.

Ideally if the belt were perfectly constructed and entrained about perfectly cylindrical rollers secured in an exactly parallel relationship with one another, the velocity vector of the belt would be substantially normal to the longitudinal axis of the roller and there would be no lateral translation of the belt. However, in actual practice, this is not feasible. Frequently, the velocity vector of the belt approaches the longitudinal axis of the roller at an angle. This produces lateral movement of the belt relative to the roller. Thus, the belt must be tracked or controlled to regulate its lateral position. Hereinbefore, lateral movement of the belt has been controlled by crowned rollers, flanged rollers or servo systems. Rollers of this type frequently produce high local stresses resulting in damage to the edges of the belt. Servo systems using steering rollers to maintain lateral control of the belt generally apply less stress to the sides thereof. However, servo systems are frequently rather complex and costly.

Various attempts have been made to develop simple and less costly steering systems. The following art appears to disclose relevant devices which control the lateral movement of a moving belt:

U.S. Pat. No. 3,435,693
Patentee: Wright et al.
Issued: Apr. 1, 1969

U.S. Pat. No. 3,500,694
Patentee: Jones et al.
Issued: Mar. 17, 1970

U.S. Pat. No. 3,540,571
Patentee: Morse
Issued: Nov. 17, 1970

U.S. Pat. No. 3,698,540
Patentee: Jorden
Issued: Oct. 17, 1972

U.S. Pat. No. 3,702,131
Patentee: Stokes et al.
Issued: Nov. 7, 1972

U.S. Pat. No. 3,818,391
Patentee: Jorden et al.
Issued: June 18, 1974

Research Disclosure Journal May 9, 1976
Author: Morse et al.
No. 14510, Page 29

U.S. Ser. No. 140,342
Filed: Apr. 14, 1980
Applicant: Hamaker

U.S. Ser. No. 168,938
Filed: July 11, 1980
Applicant: Hamaker

The pertinent portions of the foregoing art may be briefly summarized as follows:

Wright et al. discloses a belt entrained about a plurality of spaced rollers. One end of the rollers is journaled in a pivotable frame. A sensing member is forced to the right by the lateral movement of the belt. The sensing member is connected by a linkage to the frame. If the belt is forced against the sensing member, the linkage rotates the frame to a position where the belt will track away from the sensing member until equilibrium is reached.

Jones et al. describes a belt tracking system in which a sensing finger detects lateral movement of the belt and actuates a control motor. The control motor rotates a cam shaft which rotates a camming mechanism to pivot a steering roller so as to return the belt to the desired path of travel.

Morse discloses a belt tracking system having a washer journaled loosely on a steering roller shaft. A pressure roller contacts the washer. The pressure roller is mounted on a pivotable rod and connected pivotably to a servo arm. The servo arm is connected pivotably to the frame. Horizontal motion of the belt causes the pressure roller to move horizontally. This moves the servo arm vertically pivoting the steering roller to restore the belt to the desired path.

Jorden, Stokes et al. and Jorden et al. all describe a belt steering apparatus employing a disc mounted loosely on one end of a belt support roller. The disc is connected to a linkage which pivots one of the other support rollers. Lateral movement of the belt causes the disc to translate pivoting the linkage. The linkage pivots the other support roller returning the belt to the predetermined path of movement.

Morse et al. discloses a passive web tracking system. The web is supported in a closed loop path by a plurality of supports. The supports include a first roller. The first roller is pivotably mounted to align its axis of rotation to the normal direction of travel of the web. Fixed flanges engage the side edges of the web preventing lateral movement thereof. A second roller, spaced from the first roller, is supported at its midpoint by a self-aligning radial ball bearing. A yoke supports the second roller pivotably. Movement of the roller is limited to rotation about a castering axis and a gimble axis by a flecture arm. This permits the web to change direction providing uniform tension in the web span.

Hamaker ('342) describes a belt steering mechanism employing a pivotably mounted belt support roller frictionally driven to move in unison with the belt. Lateral movement of the belt applies a frictional force on the belt roller. The frictional force tilts the roller in a direction so as to restore the belt to the predetermined path of movement.

Hamaker ('938) discloses a belt alignment system in which the belt is supported to form an arcuate region. A guide engages the side edge of the belt in the arcuate region to prevent lateral movement thereof.

In accordance with one aspect of the features of the present invention, there is provided an apparatus for controlling lateral alignment of a belt arranged to move along a predetermined path. The apparatus includes means for pivotably supporting the belt. Means sense the lateral movement of the belt from the predetermined path and translate relative to the supporting means in response thereto. Means, normally spaced from the sensing means during belt movement along the predetermined path, tilt the supporting means in response to being rotated by the sensing means so as to return the belt to the predetermined path of movement.

Pursuant to another aspect of the features of the present invention, there is provided an electrophotographic printing machine of the type having a photoconductive belt arranged to move in a predetermined path through a plurality of processing stations disposed therealong. The printing machine includes means for pivotably supporting the belt. Means are provided for sensing the lateral movement of the belt from the predetermined path and translating relative to the supporting means in response thereto. Means, normally spaced from the translating means during belt movement along the predetermined path, tilt the supporting means in response to being rotated by the sensing means so as to return the belt to the predetermined path of movement.

Still another aspect of the features of the present invention is a reproducing machine of the type having a document handling system comprising a belt arranged to move in a predetermined path to transport a document to a processing station. The reproducing machine includes means for pivotably supporting the belt. Means are provided for sensing the lateral movement of the belt from the predetermined path and translating in response thereto. Means, normally spaced from the sensing means during belt movement along the predetermined path, tilt the supporting means in response to being rotated by the sensing means so as to return the belt to the predetermined path of movement.

Other aspects of the invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
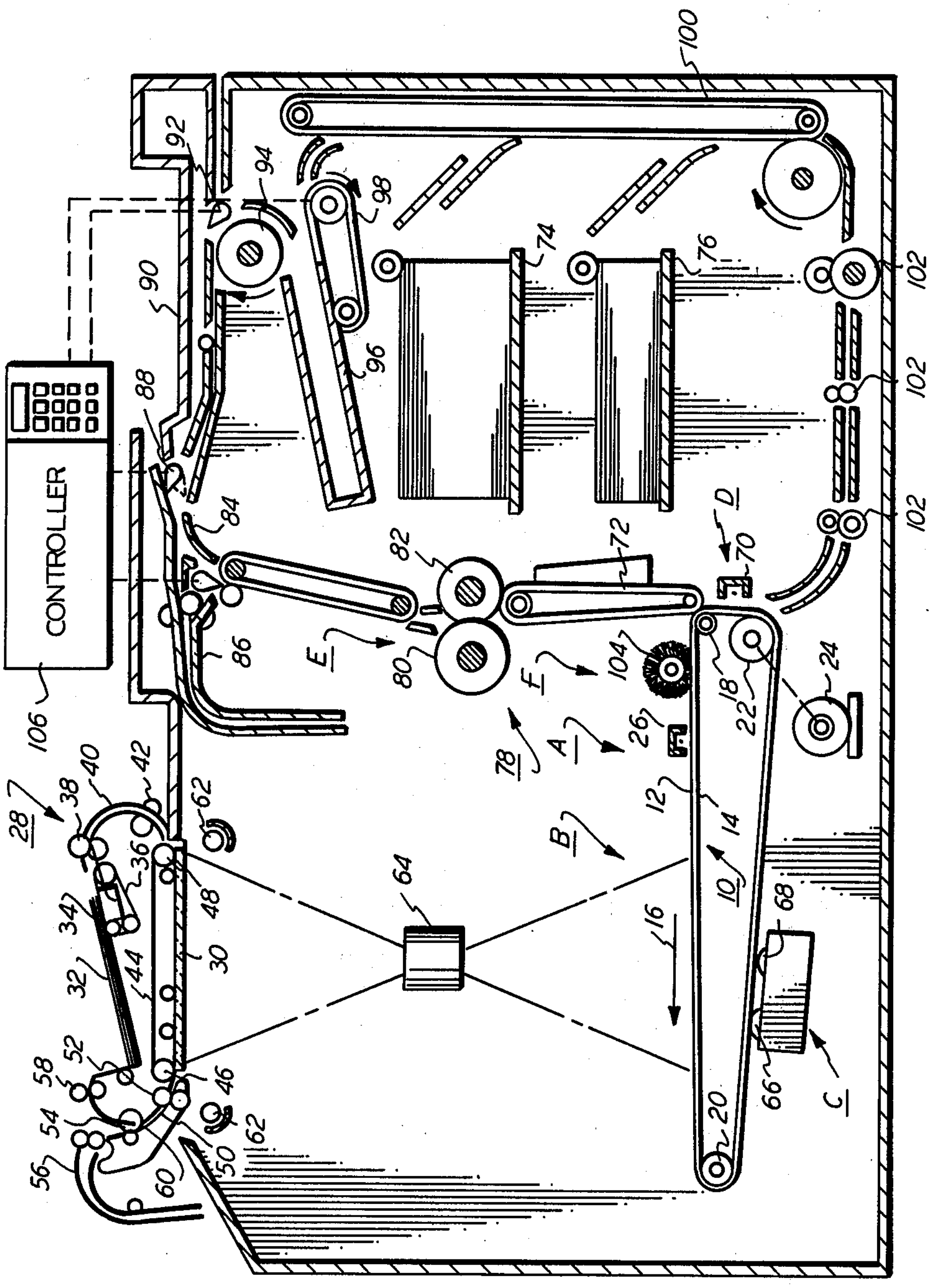
FIG. 1 is a schematic elevational view depicting an electrophotographic printing machine incorporating the features of the present invention therein.

For a general understanding of the features of the present invention, reference is made to the drawings. In the drawings, like reference numerals have been used throughout to designate identical elements. FIG. 1 schematically depicts the various components of an illustrative electrophotographic printing machine incorporating the belt control system of the present invention therein. As illustrated hereinafter, the belt control system is employed in both the document handling unit and the photoconductive belt support system. It will become evident from the following discussion that the belt control system is equally well suited for use in a wide variety of printing machines, and is not necessarily limited in its application to the particular printing machine shown herein.

Inasmuch as the art of electrophotographic printing is well known, the various processing stations employed in the FIG. 1 printing machine will be shown hereinafter schematically and their operation described briefly with reference thereto.

As shown in FIG. 1, the electrophotographic printing machine employs a belt 10 having a photoconductive surface 12 deposited on a conductive substrate 14. Preferably, photoconductive surface 12 is made from a selenium alloy with conductive substrate 14 being made from an aluminum alloy. Other suitable photoconductive materials and conductive substrates may also be employed. Belt 10 moves in the direction of arrow 16 to advance successive portions of photoconductive surface 12 sequentially through the various processing stations disposed about the path of movement thereof. Belt 10 is entrained about a stripping roller 18, steering roller 20 and drive roller 22. Stripping roller 18 is mounted rotatably so as to rotate with the movement of belt 10. Steering roller 20 tilts in response to lateral movement of belt 10 to restore belt 10 to the desired path of travel. Drive roller 22 is rotated by motor 24 coupled thereto by suitable means such as a drive belt. As roller 22 rotates, it advances belt 10 in the direction of arrow 16.

Initially, a portion of the photoconductive surface passes through charging station A. At charging station A, a corona generating device, indicated generally by the reference numeral 26, charges photoconductive surface 12 to a relatively high, substantially uniform potential.

Next, the charged portion of photoconductive surface 12 is advanced through imaging station B. At imaging station B, a document handling unit, indicated generally by the reference numeral 28, is positioned over platen 30 of the printing machine. Document handling unit 28 sequentially feeds documents from a stack 32 of documents placed by the operator facedown in a normal forward collated order in a document stacking and holding tray 34. A document feeder 36 located below tray 34 forwards the bottom document in the stack to a pair of takeaway rollers 38. The bottommost sheet is then fed by rollers 38 through document guide 40 to feed roll pair 42 and belt 44. Belt 44 is entrained about a pair of opposed spaced rollers 46 and 48, respectively. Roller 46 is a steering roller which tilts to maintain belt 44 in the predetermined path of movement. After imaging, the original document is fed from platen 30 by belt 44 into guide 50 and feed roll pairs 52 and 54. The document then advances into an inverter mechanism, indicated generally by the reference numeral 56, or back to the document stack through feed roll pair 58. Decision gate 60 is provided to divert the document either to the inverter or to feed roll pair 58. The inverter comprises a three-roll arrangement and a closed inverter pocket. If the document is to be inverted, it is fed through the lower two rolls of the three-roll inverter into the pocket. When the trail edge of the document clears the nip of the lower two rolls in the three-roll inverter, the stiffness of the sheet will cause the trail edge to straighten up into the nip of the upper two rollers of the inverter at which time it will be fed into roll pair 58 and back onto the document stack. Document handling unit 28 is also provided with a sheet separator finger to separate the documents to be fed from those documents returned to tray 34. Upon removal of the last document from beneath the finger, the finger drops through a slot provided in the tray, suitable sensors are provided to sense that the last document in the set has been removed from the tray, and the finger is rotated in a clockwise direction to again rest on the top of the stack of documents prior to subsequent recirculation of the document set. Imaging of a document on platen 30 is achieved by lamps 62 which illuminate the document positioned thereon. Light rays reflected from the document are transmitted through lens 64. Lens 64 focuses the light image of the original document onto the charged portion of the photoconductive surface of belt 10 to selective dissipate the charge thereof. This records an electrostatic latent image on the photoconductive surface which corresponds to the informational areas contained within the original document. Thereafter, belt 10 advances the electrostatic latent image recorded on the photoconductive surface to development station C. The detailed structure of belt steering roller 46 and photoconductive belt steering roller 20, both of which are substantially identical, will be described hereinafter with reference to FIGS. 2 through 6, inclusive.

With continued reference to FIG. 1, at development station C, a pair of magnetic brush developer rollers, indicated generally by the reference numerals 66 and 68, advance developer material into contact with the electrostatic latent image. The latent image attracts toner particles from the carrier granules of the developer material to form a toner powder image on the photoconductive surface of belt 10.

Belt 10 then advances the toner powder image to transfer station D. At transfer station D, a copy sheet is moved into contact with the toner powder image. Transfer station D includes a corona generating device 70 which sprays ions onto the backside of the copy sheet. This attracts the toner powder image from the photoconductive surface of belt 10 to the sheet. After transfer, conveyor 72 advances the sheet to fusing station E.

The copy sheets are fed from a selected one of the trays 74 or 76 to transfer station D. After transfer of the toner powder image to the first side of the copy sheet, the sheet is advanced by vacuum conveyor 72 to fusing station E.

Fusing station E includes a fuser assembly, indicated generally by the reference numeral 78, which permanently affixes the transferred powder image to the copy sheet. Preferably, fuser assembly 78 includes a heated fuser roller 80 and a backup roller 82. The sheet passes between fuser roller 80 and backup roller 82 with the powder image contacting fuser roller 80. In this manner, the powder image is permanently affixed to the copy sheet.

After fusing, the copy sheets are fed to gate 84 which functions as an inverter selector. Depending upon the position of gate 84, the copy sheets will be deflected into a sheet inverter 86 or bypass inverter 86 and be fed directly onto a second decision gate 88. The sheets which bypass inverter 86 turn a 90° corner in the sheet path before reaching gate 88. Gate 88 inverts the sheets into a face up orientation so that the image side, which has been transferred or fused, is face up. If inverter path 86 is selected, the opposite is true, i.e. the last printed side is facedown. The second decision gate 88 either deflects the sheet directly into an output tray 90 or deflects the sheets into a transport path which carries them on without inversion to a third decision gate 92. Gate 92 either passes the sheets directly on without inversion into the output path of the copier, or deflects the sheets onto a duplex inverter roll 94. Roll 94 inverts and stacks sheets to be duplexed in a duplex tray 96 when gate 92 so directs. Duplex tray 96 provides intermediate or buffer storage for those sheets which have been printed on one side on which an image will be subsequently printed on the side opposed thereto, i.e. the sheets being duplexed. Due to sheet inverting by roll 94, these buffer sheets are stacked in tray 96 facedown. They are stacked in duplex tray 96 on top of one another in the order in which they are copied.

In order to complete duplex copying, the simplex sheets in tray 96 are fed in seriatim by bottom feeder 98 from tray 96 back to transfer station D for transfer of the toner powder image to the opposed side of the copy sheet. Conveyor 100 and rollers 102 advance the sheet along a path which produces an inversion thereof. However, inasmuch as the bottommost sheet is fed from duplex tray 96, the proper or clean side of the copy sheet is positioned in contact with belt 10 at transfer station D so that the toner powder image thereon is transferred thereto. The duplex sheets are then fed through the same path as the simplex sheets to be stacked in tray 90 for subsequent removal by the printing machine operator.

With continued reference to FIG. 1, invariably after the copy sheet is separated from the photoconductive surface of belt 10, some residual particles remain adhering thereto. These residual particles are removed from the photoconductive surface at cleaning station F. Cleaning station F includes a rotatably mounted fibrous brush 104 in contact with the photoconductive surface of belt 10. The particles are cleaned from the photoconductive surface of belt 10 by the rotation of brush 104 in contact therewith. Subsequent to cleaning a discharge lamp (not shown) floods the photoconductive surface with light to dissipate any residual electrostatic charge remaining thereon prior to the charging thereof for the next successive imaging cycle.

Controller 106 is preferably a programmable microprocessor which controls all the machine functions hereinbefore described. The controller provides the storage and comparison of counts of the copy sheets, the number of documents being recirculated in the document sets, the number of copy sheets selected by the operator, time delays, jam correction control, etc.. The control of all the exemplary systems heretofore described may be accomplished by conventional control switch inputs from the printing machine console selected by the operator. These signals activate nonelectrical, solenoid or jam control sheet deflector fingers, or drive motors, or their clutches in the selected steps or sequences. Conventional sheet path sensors or switches may be utilized for counting or keeping track of the position of the document and copy sheets.

It is believed that the foregoing description is sufficient for purposes of the present application to illustrate the general operation of an electrophotographic printing machine incorporating the features of the present invention therein.

Referring now to the specific subject matter of the present invention, the general operation of the belt steering system employed in conjunction with steering roller 46 for document handling unit 28 or steering roller 20 for photoconductive belt 10, will be described hereinafter with reference to FIGS. 2 through 6, inclusive. Both steering roller 46 and steering roller 20 are substantially identical to one another.

Figure 2:
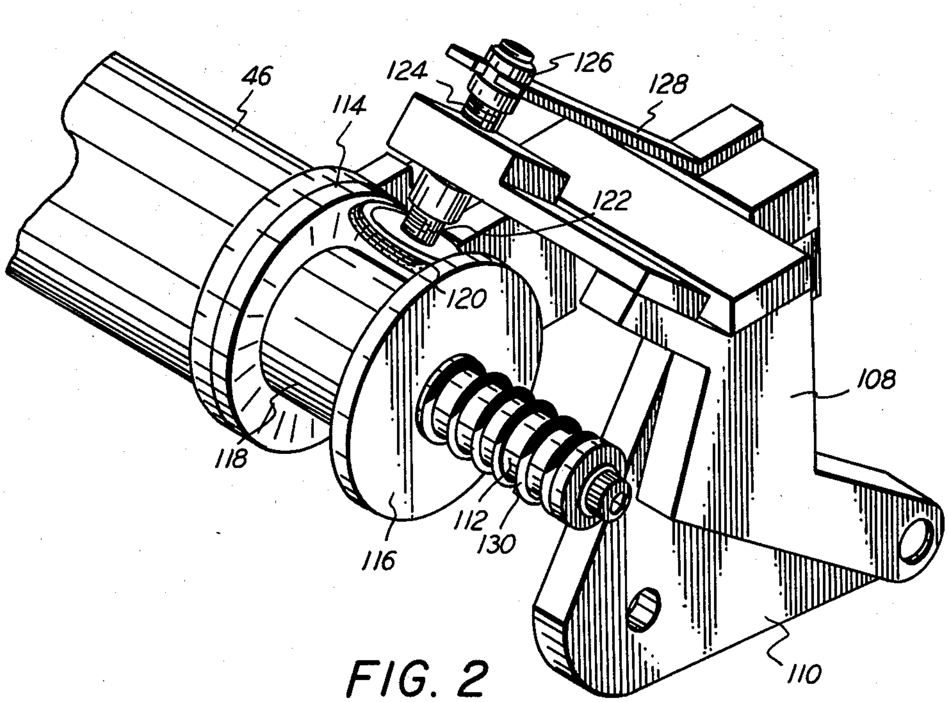
FIG. 2 is a fragmentary perspective view of the belt control system used in the FIG. 1 printing machine.
Figure 3:
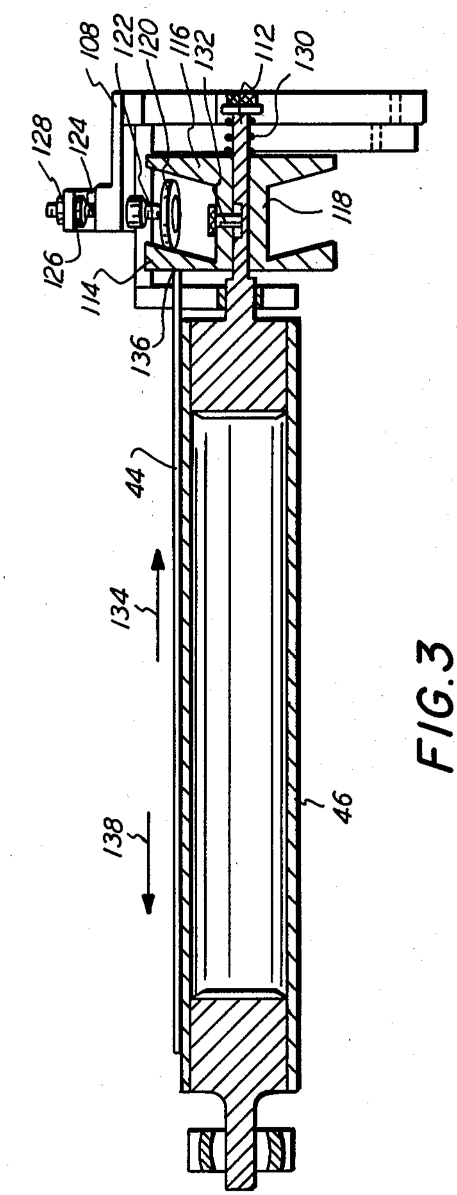
FIG. 3 is a plan view showing the FIG. 2 belt control system.

For purposes of illustration, the belt steering system associated with steering roller 46 of document handling unit 28 will be described hereinafter. As shown in FIGS. 2 and 3, steering roller 46 is mounted rotatably in holder 108. Holder 108 is mounted pivotably on frame 110. In this way, any providing of holder 108 will tilt steering roller 46. Elongated roller 46 is mounted rotatably in suitable bearings in holder 108. An elongated shaft 112 extends outwardly from one side of roller 46. A pair of opposed spaced flanges 114 and 116 extend outwardly from member 118 mounted slidably on shaft 112. Disc 120 is interposed between flanges 114 and 116. The surfaces of flanges 114 and 116 opposed from disc 120 are conical. Disc 120 has a rod 122 extending outwardly therefrom. Rod 122 has a threaded portion 124 in threaded engagement with holder 108. Free end portion 126 of rod 122 engages stop plate 128. In this way, rotation of disc 120 causes rod 122 to rotate. As rod 122 rotates, the threaded portion, i.e. portion 124 thereof, pivots holder 108 relative to frame 110. Spring 130 is in engagement with flange 116 to resiliently urge flange 114 into contact with belt 10. Pin 132 is located in a slot in member 118. In this way, pin 132 secures member 118 to shaft 112 permitting member 118 to slide relative thereto while rotating therewith.

In operation, as belt 44 moves in the direction of arrow 134, side edge 136 of belt 44 engages one side of flange 118. This causes member 112 and flanges 114 and 116 to slide in the direction of arrow 134. The resilient force applied by spring 130 maintains flange 114 in engagement with edge 136 of belt 44. The conical surface of flange 114 engages disc 120. As flange 114 rotates with roller 46, disc 120 is frictionally rotated about its axis. Threaded portion 124 rotates with rod 122 to pivot holder 108 and tilt roller 46 moving belt 44 in the direction of arrow 138. In this way, belt 10 returns to the predetermined path of travel.

In the event belt 10 moves in the direction of arrow 138, spring 130 resiliently urges flange 114 against side edge 136 thereof. Member 118 slides on shaft 112 until the conical surface of flange 116 engages disc 120. As roller 46 rotates, member 118 and flanges 114 and 116 rotate therewith. In this way, flange 116 frictionally rotates disc 120 in a direction opposite to that of flange 114. Thus, threaded portion 124 pivots holder 108 in the opposite direction to that produced by the rotation of disc 120 by flange 114. Rotation of disc 120 pivots holder 108 to tilt roller 46 such that belt 10 moves in the direction of arrow 134 toward the predetermined path of travel.

If the tilting of roller 46 in the proper direction does not provide sufficient force to stop the belt from moving laterally, member 118 will move unit it hits a stop, i.e. pin 132 acts as a stop. At this point, belt 44 becomes edge guided with some of the restraining force being provided by surface friction. The conical surfaces of flanges 114 and 116 automatically disengage from disc 120 preventing abuse and wear thereof.

Figure 4:
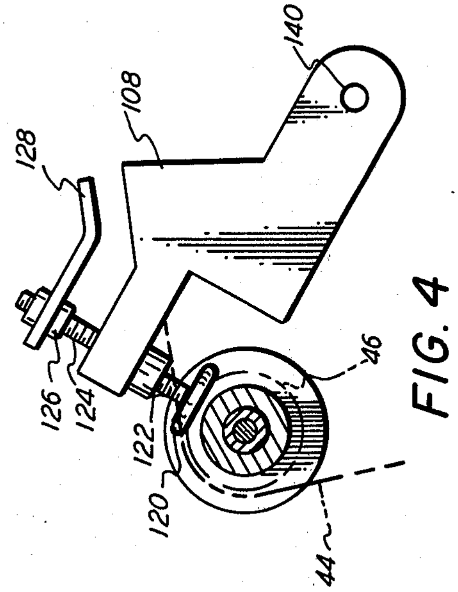
FIG. 4 is a side elevational view of the FIG. 2 belt control system.

Referring now to FIG. 4, there is shown a side view of the belt control system depicted in FIGS. 2 and 3. As illustrated thereat, belt 44 is entrained about roller 46. The conical surfaces of flanges 114 and 116 are adapted to engage and frictionally rotate disc 120 which, in turn, rotates rod 122. Rod 122 has a threaded portion 124 in threaded engagement with holder 108. Holder 108 is pivoted about pin 140. Stop plate 128 engages free end portion 126 of rod 122 to prevent translation thereof. Threaded portion 124 of rod 122 rotates with disc 120 to pivot holder 108 about pin 140. As holder 108 pivots, roller 46 tilts in a direction such that belt 44 returns to the predetermined path of travel.

Figure 5:
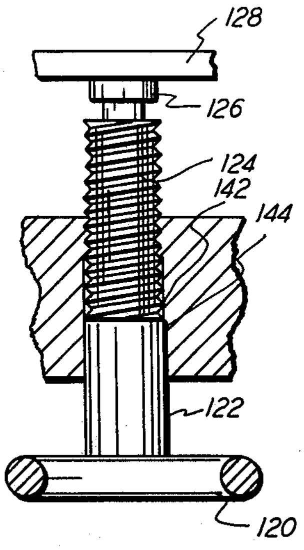
FIG. 5 is a fragmentary cross-sectional view of one embodiment of the friction wheel used in the FIG. 2 belt control system.

Referring now to FIG. 5, there is shown one embodiment of disc 120 with rod 122 having threaded portion 124 thereof in threaded engagement with threaded portion 142 of holder 108. As shown thereat, threaded portion 142 extends only over a portion of holder 108 with the remaining portion 144 thereof being a counterbored hole to provide clearance for rod 122. Thus, threaded portion 124 of rod 122 is in threaded engagement with the threaded portion 142 of holder 108. Free end portion 126 of rod 122 engages stop plate 128. Rotation of disc 120 causes corresponding rotation of rod 122 and threaded portion 124 in threaded portion 142 of holder 108. This causes holder 108 to pivot tilting roller 46 so that belt 44 returns to the predetermined path of travel.

Figure 6:
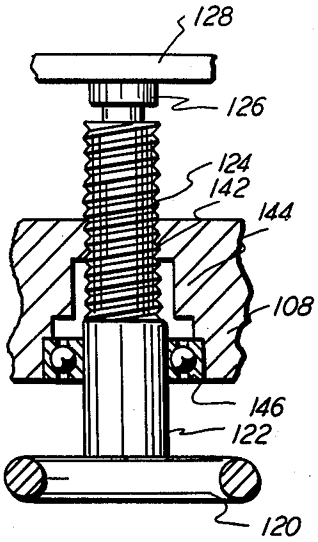
FIG. 6 is a fragmentary cross-sectional view of another embodiment of the friction wheel used in the FIG. 2 belt control system.

Turning now to FIG. 6, there is shown another embodiment of disc 120 having rod 122 extending therefrom with portion 124 in threaded engagement with portion 142 of holder 108. Ball bearings 146 are mounted in a countersunk portion of hole 144 to align and provide rotation of rod 122 relative to holder 108. This minimizes friction between holder 108 and rod 122 during the rotation of disc 120. As disc 120 rotates, rod 122 rotates in conjunction therewith. Rotation of rod 122 causes threaded portion 124 to rotate in threaded portion 142 of holder 108. Holder 108 pivots about pin 140 (FIG. 4) to tilt roller 46 so as to return belt 44 to the predetermined path of travel.

In recapitulation, it is evident that the apparatus of the present invention controls lateral movement of a belt and provides a support therefore. Any lateral movement of the belt induces tilting in a roller support to restore the belt to the predetermined path of travel.

It is, therefore, evident that there has been provided in accordance with the present invention, an apparatus for supporting and controlling the lateral movement of a belt so that the belt moves in a preselected path of travel. This apparatus fully satisfies the aims and advantages hereinbefore set forth. While this invention has been described in conjunction with a specific embodiment thereof, it will be evident that many alternatives, modifications and variations will be apparent to those skilled in the art. Accordingly, it is intended to embrace all such alternatives, modifications and variations as fall within the spirit and broad scope of the appended claims.

What is claimed is:

1. An apparatus for controlling the lateral alignment of a belt arranged to move along a predetermined path, including:

means for pivotably supporting the belt, said means for pivotably supporting the belt comprising a frame, an elongated roller, and means, mounted pivotably on said frame, for rotatably holding said roller;

means for sensing lateral movement of the belt from the predetermined path and translating relative to said supporting means in response thereto, said means for sensing comprising:

a shaft extending outwardly from one end of said roller, a member mounted slidably on said shaft, a pair of opposed, spaced flanges extending outwardly from said member with said tilting means being interposed between said pair of flanges, and means for resiliently urging one of said pair of flanges into contact with one edge of the belt; and means, normally spaced from said sensing means during belt movement along the predetermined path, for tilting said supporting means in response to said sensing means rotating said tilting means so as to return the belt to the predetermined path of movement.

2. An apparatus according to claim 1, wherein said member slides a pre-selected distance relative to said shaft and thereafter remains stationary relative thereto so that one of said pair of flanges prevents further lateral movement of the belt.

3. An apparatus according to claim 1, wherein said tilting means includes a disc interposed between said pair of flanges, said disc being frictionally rotated by one of said pair of flanges to pivot said holding means in one direction and being frictionally rotated in the opposite direction by the other of said pair of flanges to pivot said holding means in the opposite direction.

4. An apparatus according to claim 3, wherein said tilting means includes:

a rod secured to said disc and having a threaded portion in threaded engagement with said holding means; and a stop engaging the free end of said rod to prevent translation thereof during rotation of said disc, said holding means pivoting as said disc rotates said rod.

5. An improved electrophotographic printing machine of the type having a photoconductive belt arranged to move in a predetermined path through a plurality of processing stations disposed therealong, wherein the improvement includes:

means for pivotably supporting the photoconductive belt, said means for pivotably supporting the photoconductive belt comprising a frame, an elongated roller, and means, mounted pivotably on said frame, for rotatably holding said rollers;

means for sensing lateral movement of the belt from the predetermined path and translating relative to said supporting means in response thereto, said means for sensing comprising:

a shaft extending outwardly from one end of said roller, a member mounted slidably on said shaft, a pair of opposed, spaced flanges extending outwardly from said member with said tilting means being interposed between said pair of flanges, and means for resiliently urging one of said pair of flanges into contact with one edge of the belt; and means, normally spaced from said sensing means during photoconductive belt movement along the predetermined path, for tilting said supporting means in response to said sensing means rotating said tilting means so as to return the belt to the predetermined path of movement.

6. A printing machine according to claim 5, wherein said member slides a pre-selected distance relative to said shaft and thereafter remains stationary relative thereto so that one of said pair of flanges prevents further lateral movement of the belt.

7. A printing machine according to claim 5, wherein said tilting means includes a disc interposed between said pair of flanges, said disc being frictionally rotated by one of said pair of flanges to pivot said holding means in one direction and being frictionally rotated in the opposite direction by the other of said pair of flanges to pivot said holding means in the opposite direction.

8. A printing machine according to claim 6, wherein said tilting means includes:

a rod secured to said disc and having a threaded portion in threaded engagement with said holding means; and a stop engaging the free end of said rod to prevent translation thereof during rotation of said disc, said holding means pivoting as said disc rotates said rod.

9. An improved reproducing machine of the type having a document handling system comprising a belt arranged to move in a predetermined path to transport a document to a processing station, wherein the improvement includes:

means for pivotably supporting the belt, said supporting means comprising a frame, an elongated roller, and means, mounted pivotably on said frame, for rotatably holding said roller;

means for sensing lateral movement of the belt from the predetermined path and translating relative to said supporting means in response thereto, said sensing means comprising:

a shaft extending outwardly from one end of said roller, a member mounted slidably on said shaft, a pair of opposed, spaced flanges extending outwardly from said member with said tilting means being interposed between said pair of flanges and means for resiliently urging one of said pair of flanges into contact with one edge of the belt; and means, normally spaced from said sensing means during belt movement along the predetermined path, for tilting said supporting means in response to said sensing means rotating said tilting means so as to return the belt to the predetermined path of movement.

10. A reproducing machine according to claim 9, wherein said member slides a pre-selected distance relative to said shaft and thereafter remains stationary relative thereto so that one of said pair of flanges prevents further lateral movement of the belt.

11. A reproducing machine according to claim 9, wherein said tilting means includes a disc interposed between said pair of flanges, said disc being frictionally rotated by one of said pair of flanges to pivot said holding means in one direction and being frictionally rotated in the opposite direction by the other of said pair of flanges to pivot said holding means in the opposite direction.

12. A reproducing machine according to claim 11, wherein said tilting means includes:

a rod secured to said disc and having a threaded portion in threaded engagement with said holding means; and a stop engaging the free end of said rod to prevent translation thereof during rotation of said disc, said holding means pivoting as said disc rotates said rod.

* * * * *